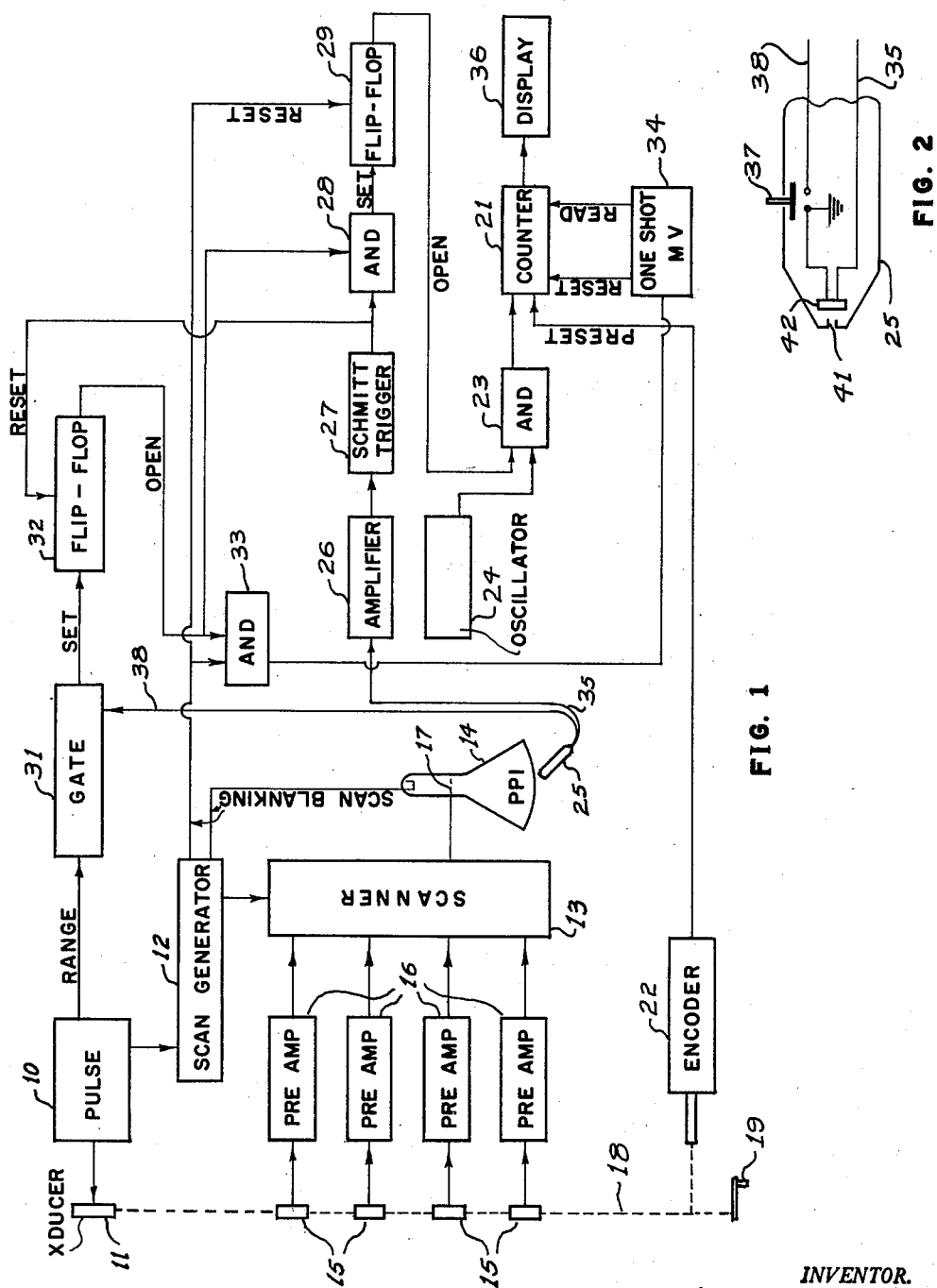

United States Patent Office 3,129,402
Patented Apr. 14, 1964

3,129,402
DIGITAL BEARING READOUT FOR SECTOR SCAN SONAR
Alfred M. Henne, Panama City, Fla., assignor to the United States of America as represented by the Secretary of the Navy
Filed Oct. 30, 1962, Ser. No. 234,583
4 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The present invention relates to underwater search sonar detecting systems of the sector scan type which provide a plan position indication (PPI) display from which the bearing of a target can be ascertained and more particularly to an apparatus for increasing the accuracy of bearing readout from the PPI presentation.

An object of the invention is the provision of an apparatus which will display legibly in the vernacular the bearing data provided by an underwater sound echo target locating system.

Certain present search sonar sets such as the AN/UQS-1 mine detecting sonar use a sector scan in which approximately 20° of area are scanned with each transmitted acoustic pulse. A plurality of directive transducers (hydrophones) receive the reflected signal from unique azimuths within the sector scan and their outputs are sequentially applied to the intensity grid of a PPI scope which is swept in a triangular pattern to decode the information and present it in its relative location. In this 20° sector scan form of PPI presentation an electron beam is swept across the face of the cathode ray tube radially from the center to the periphery as a function of range, and as the beam travels outwarly this sweep is repeatedly rotated 20° (clockwise) about the central point as the directional transducers of the sonar system are scanned in azimuth. Sound echoes from targets are used to intensify the sweep trace at points corresponding to their positions, and thus with the origin of the scan representing the position of the transducers the relative position of any target with respect to the origin is displayed linearly in both Cartesian and polar coordinates, i.e., an undistorted map of the targets is displayed. When the transducers are stationary a sector 20° in azimuth is automatically searched, this 20° in azimuth being indicated on the face of the PPI tube as a 20° triangular sector which will rotate on the face of the tube as the transducers are rotated. Obviously the sector scanned may have any angular width up to 360°.

Generally a cursor representing the center of the sweep is rotated by hand to bring it into coincidence with a displayed target, the angle of the cursor being then read to obtain bearing. This operation is time consuming, especially when several targets on different bearings are to be read, and in addition, the accuracy of the operator in placing the cursor on the target permits considerable error. Accordingly, another object of the invention is to increase the speed and accuracy of bearing readout for search sonar systems.

Further object of the invention is to provide a bearing readout system in which the bearing is determined independently of the deflection circuitry in the target locating display scope.

In accordance with a feature of the invention bearing readout inaccuracies due to operator carelessness are minimized by requiring only that the operator place a probe over the target spot on the display scope within a certain accuracy for it to be effective.

In accordance with another feature of the invention the bearing is determined by measuring the time interval between the received target echo and the blanking pulse representing the edge of the particular scan line on which the target appears, such measuring preferably being accomplished by enabling during such time interval a counter connected to a fixed frequency oscillator. By selecting an oscillator frequency equal to the product of the number of degrees in the sector times the repetition rate of the scan line the readout of the counter is direct, i.e., it counts in increments of degrees.

In accordance with the present invention a hand held probe, which is preferably a photocell mounted in the end of a pen-like holder, employed to select a target on the display scope, generates a timing pulse which is operative to connect the counter to the oscillator to start a counting cycle which is terminated by the next scan blanking pulse, whereby the count represents the angular difference between the target and the end of the scan line and may be displayed by the counter.

The AN/UQS-1 mine detecting sonar which is standard equipment on all mine hunting vessels in the U.S. Fleet is a pulse modulated sonar with a frequency of 100 kilocycles per second and a pulse length of one millisecond. The transmitted pulse insonifies a volume of water 60° in azimuth and 10° in depression. The receiver comprises 23 pairs of transducers (46 crystals connected in doublets) which cover a sector 20° in azimuth and 10° in depression, each receiver pair having a directivity of approximately 2½°. The outputs from the 23 transducer pairs are individually amplified and scanned in succession at the rate of a thousand times a second by a control system including a delay line scanner which operates the amplifiers as switches to connect their outputs to the grid of the PPI display tube. A range and scan generator among other functions provides a triangular sector on the face of the PPI tube, range retrace blanking, scan retrace blanking and close-in range blanking to the PPI tube. Theoretical resolution of this sonar is approximately 3° in azimuth (bearing) and 2 yards in range. The preferred embodiment of the invention will be described as incorporated in the AN/UQS-1 mine detecting sonar.

The invention together with further objects thereof will be understood from the following description taken in connection with the accompanying drawing in which FIG. 1 is a block diagram of a bearing readout system in accordance with the invention and FIG. 2 is a conventionalized fragmentary showing of a portion of the hand held probe.

The sector scan sonar shown in FIG. 1 comprises a pulse generator 10 which periodically energizes a transducer 11 to transmit into the water short pulses of acoustic energy. In time relation therewith, the pulse generator 10 provides a timing pulse to a range and scan generator 12 which emits control signals to a receiver scanner 13, blanking pulses to a PPI tube 14 and synchronizes the deflection circuits (not shown) of the PPI tube 14. A plurality of directional transducers 15, of which only 4 are shown, convert received echos into electrical signals which after being individually amplified by amplifiers 16 are, under the control of the scanner 13, applied in succession to the intensity grid 17 of the PPI tube 14. The receiver transducers 15 are mounted to be rotated in azimuth in assembly with the transducer 11 by a shaft 18 which may be manually rotated as by hand crank 19. When the sonar is operated in the search mode, as distinguished from the detecting mode after the target had been found, the shaft 18 is continually rotated by motor means not here pertinent. The sonar thus far described is standard equipment which displays on the face of the PPI tube 14 a triangular sector having its vertex at the center of the tube face and displaying an indication of the range and bearing of any target.

By definition the bearing of a direction is the number of degrees measured clockwise from North. By convention the scan lines in a sector scan presentation are in the clockwise direction and the leading edge of the scan sector is in the direction of increasing bearing, i.e., clockwise. In this type of display the target position within the 20° sector has a radial position as a function of range and a position along a scan line as a function of bearing. Thus when a target has the bearing $\theta$ the leading edge of the sector will have a bearing of $\theta+\Delta\theta$ where $\Delta\theta$ is the distance the target is from the leading edge of the sector. In accordance with the invention, a counter 21 is preset to the bearing of the leading edge of the sector scan by an encoder 22 mechanically coupled to the transducer shaft 18. As hereinafter described, when a target signal is received as sensed by a probe, an AND gate 23 is opened to connect the counter 21 to an oscillator 24 to start counting in the negative direction until the scan line on which the target appears reaches the leading edge of the sector. The blanking pulse ending the scan stops the counter at a reading of $(\theta+\Delta\theta)-\Delta\theta$ which of course is equal to $\theta$, the bearing of the target. A photocell probe 25, when placed over a target on the face of the tube 14 provides on a lead 35, an electrical pulse which after being amplified by an amplifier 26 and sharpened by a Schmitt trigger circuit 27, passes through an AND gate 28 to set a flip-flop 29 into its "one" state in which condition it provides an open signal to the AND gate 23. This sharpened pulse resets the flip-flop 32 after a finite time interval sufficient for the pulse to transit the AND gate 28. This resetting of the flip-flop 32 returns the AND gates 28 and 33 to their closed condition. The scan blanking pulse from the scan generator 12 resets the flip-flop 29 which closes the AND gate 23 to stop the counter 21.

It will be evident that the bearing of the trailing edge of the sector scan can be utilized to preset the counter 21 in which case the counter would be started at the beginning of each scan line to count in the positive direction until stopped by a pulse from the probe 25. Such an arrangement is not preferred since it involves a dynamic situation rather than the static situation above described. That is, in the preferred static arrangement, the counter is called into use only when a target bearing is to be taken, whereas, in the dynamic situation referred to, the counter is actuated for each scan line which in practice means about one-thousand starts and resets per second.

The hand manipulated light sensitive probe 25 is provided at one end with a relatively small aperture 41 behind which is mounted a light sensitive cell 42 adapted when energized by a brightened spot, i.e., target, on the face of the tube 14 to transmit a pulse of the lead 35 for the purpose described above.

Each time the pulse generator 10 energizes the transducer 11, it simultaneously provides a pulse of the same length through a normally open gate 31 to set a flip-flop circuit 32 into its "one" state in which condition an open signal is supplied to the AND gate 28 and to an AND gate 33 connected between the scan generator 12 and a one shot (monostable) multivibrator 34. The leading edge of the pulse from the multivibrator 34 resets the counter 21 to zero after which the trailing edge of the pulse reads into the counter 21 the preset information available from the encoder 22. The counter 21 is connected to a display unit 36 from which the bearing may be read in decimal digits directly in degrees when, as preferred, the frequency of the oscillator 24 is selected as above described. In order that the operator may maintain the reading on the display unit 36 for a period of time, the probe 25 is provided with a normally open switch 37 which may be manually closed to complete through a lead 38 a ground connection to the normally open gate 31 to close the gate 31 thereby preventing succeeding range pulses from the pulse generator 10 from entering the system and changing the count. Upon release of the switch 37, the next range pulse will initiate anew the foregoing cycle. A push button similar to the switch 37 may be provided on any remote bearing indicator. Simultaneously with the bearing readout as above described, the output from the probe 25 is preferably also utilized to obtain range readout in the manner described in my co-pending application Serial No. 215,466, filed August 7, 1962.

Inasmuch as the digital probe of the present invention functions strictly on the basis of time signals and shaft positions it will be evident that its accuracy is unaffected by non-linearities of the PPI display or any shift in the position of the display. Accordingly, any distortion of the display has no effect so long as the target is displayed and is recognized by the operator as a target. It will also be evident that the present system has the advantage that there need be only one range sweep after target validation for the unit to read out bearing. This system also has the advantage of requiring less operator training or concentration since the use of the probe 25 is primarily a pointing action which most people naturally can do with the required accuracy. Another advantage is that the readout is legible to the operator and others as desired without the need for interpretation as well as being numerically correct for computer input, this latter being relatively unimportant since a computer can readily handle information which would be illegible to the operator. Finally, the accuracy provided by the present system depends only on the accuracy of the constant frequency of the oscillator 34.

While for the purpose of disclosing the invention a specific embodiment thereof has been described in detail, it will be evident to those skilled in the art that many modifications may be made in the system without departing from the invention, the scope of which is pointed out in the appended claims.

What is claimed is:

1. In a sector scan pulse sonar system in which energy pulses are periodically transmitted and echoes of the transmitted pulses returned by a distant target are utilized to brighten a spot on the viewing screen of a cathode ray tube in an azimuthal position corresponding to the bearing of the target and along a scan line having leading and trailing edges controlled in time by a scan generator and of known bearings, bearing readout apparatus including:
  a counter,
  means operative under the control of the scan generator to read into the counter the bearing of one of the edges of said scan line,
  a fixed frequency oscillator,
  a hand manipulated light sensitive probe operative when placed over a brightened spot on said screen to provide a control pulse, and
  means under the joint control of said scan generator and said control pulse for connecting said counter to said oscillator during the time interval between the occurrence in time of said one of said scan line edges and of said control pulse.

2. In a sonar system in accordance with claim 1 wherein
  the means operative under the control of the scan generator reads into the counter the bearing of the trailing edge of said scan line, and
  said jointly controlled means connects the counter to said oscillator in time relation with the trailing edge of said scan line and said control pulse disconnects the counter from said oscillator,
  whereby with the counter counting in the positive direction the final count is a direct function of the bearing of said brightened spot.

3. In a sonar system in accordance with claim 1 wherein
  the means operative under the control of the scan generator reads into the counter the bearing of the leading edge of said scan line, and
  said jointly controlled means connects the counter to said oscillator in response to said control pulse and disconnects the counter from said oscillator in time relation with the leading edge of said scan line, whereby with the counter counting in the negative direction the final count is a direct function of the bearing of said brightened spot.

4. In a sonar system in accordance with claim 1 wherein the counter includes a unit for displaying in decimal digits the bearing readout directly in degrees.

References Cited in the file of this patent

UNITED STATES PATENTS

| | | |
|---|---|---|
| 2,903,690 | Slack | Sept. 8, 1959 |
| 3,031,656 | Wood | Apr. 24, 1962 |